United States Patent

Sens et al.

[11] Patent Number: 5,079,365
[45] Date of Patent: Jan. 7, 1992

[54] TRIAZOLOPYRIDINE DYES AND THERMAL TRANSFER OF METHINE DYES

[75] Inventors: Rüdiger Sens, Mannheim; Ernst Schefczik, Ludwigshafen; Karl-Heinz Etzbach, Frankenthal; Gunther Lamm, Hassloch; Helmut Reichelt, Neustadt; Matthias Wiesenfeldt, Mutterstadt, all of Fed. Rep. of Germany

[73] Assignee: BASF Aktiengesellschaft, Ludwigshafen, Fed. Rep. of Germany

[21] Appl. No.: 569,914

[22] Filed: Aug. 20, 1990

[30] Foreign Application Priority Data

Sep. 7, 1989 [DE] Fed. Rep. of Germany ....... 3929698

[51] Int. Cl.$^5$ .......................................... C07D 471/02
[52] U.S. Cl. .................... 546/119; 546/118; 546/120; 546/121; 544/105; 544/133; 503/227
[58] Field of Search ............ 546/120, 119, 121, 118; 503/227; 544/133, 105

[56] References Cited

U.S. PATENT DOCUMENTS 4,769,360  9/1988  Evans et al. .................. 503/227

FOREIGN PATENT DOCUMENTS

| | | |
|---|---|---|
| 0111004 | 6/1984 | European Pat. Off. |
| 0133011 | 2/1985 | European Pat. Off. |
| 0133012 | 2/1985 | European Pat. Off. |
| 0192435 | 8/1986 | European Pat. Off. |
| 0216483 | 4/1987 | European Pat. Off. |
| 0227092 | 7/1987 | European Pat. Off. |
| 0227094 | 7/1987 | European Pat. Off. |
| 0227095 | 7/1987 | European Pat. Off. |
| 0245860 | 11/1987 | European Pat. Off. ............. 546/120 |
| 3524519 | 1/1986 | Fed. Rep. of Germany . |
| 2161824A | 1/1986 | United Kingdom ................ 503/227 |

*Primary Examiner*—Glennon H. Hollrah
*Assistant Examiner*—Shailendra Kumar
*Attorney, Agent, or Firm*—Oblon, Spivak, McClelland, Maier & Neustadt

[57] ABSTRACT

Triazolopyridine dyes useful for thermal transfer of methine dyes have the formula

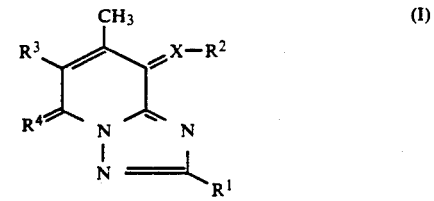

where
$R^1$ is $C_1$-$C_{20}$-alkyl, which may be substituted and interrupted by one or more oxygen atoms, or is substituted or unsubstituted phenyl or hydroxyl,
$R^2$ is a 5- or 6-membered carbocyclic or heterocyclic ring which may be substituted and benzofused,
$R^3$ is cyano, carbamoyl, carboxyl or $C_1$-$C_4$-alkoxycarbonyl,
$R^4$ is oxygen or a radical of the formula

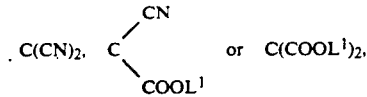

where $L^1$ is in each case $C_1$-$C_6$-alkyl which may be interrupted by 1 or 2 oxygen atoms, and
X is CH or nitrogen.

4 Claims, No Drawings

TRIAZOLOPYRIDINE DYES AND THERMAL TRANSFER OF METHINE DYES

The present invention relates to novel triazolopyridine dyes of the formula I

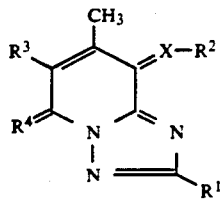

(I)

where $R^1$ is $C_1$–$C_{20}$-alkyl, which may be substituted and interrupted by one or more oxygen atoms, or is substituted or unsubstituted phenyl or hydroxyl, $R^2$ is a 5- or 6-membered carbocyclic or heterocyclic ring which may be substituted and benzo fused, $R^3$ is cyano, carbamoyl, carboxyl or $C_1$–$C_4$-alkoxycarbonyl, $R^4$ is oxygen or a radical of the formula

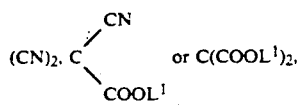

where $L^1$ is in each case $C_1$–$C_4$-alkyl which may be interrupted by 1 or 2 oxygen atoms, and X is CH or nitrogen, and to a process for the thermal transfer of methine dyes.

U.S. Pat. No. A-4 769 360 discloses benzoquinoneimine dyes which are derived from p-phenylenediamine derivatives and are said to be suitable for thermal transfer printing. However, it has been found that these dyes have inadequate coloristic properties.

It is an object of the present invention to provide new dyes which are advantageous for the thermal transfer process.

We have found that this object is achieved by the triazolopyridine dyes of the formula I defined at the beginning.

The dyes of the formula I can exist in multiple tautomeric forms which are all encompassed by the claim. For example, compounds where $R^4$ is oxygen can exist inter alia in the following tautomeric forms:

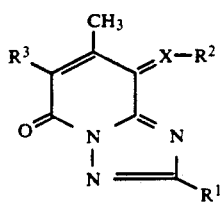

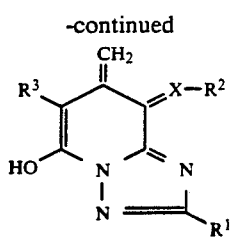

When $R^1$ in the formula I is substituted $C_1$–$C_{20}$-alkyl, possible substituents are for example phenyl, $C_1$–$C_4$-alkylphenyl, $C_1$–$C_4$-alkoxyphenyl, halophenyl, $C_1$–$C_8$-alkanoyloxy, $C_1$–$C_{20}$-alkoxycarbonyl, $C_1$–$C_{20}$-alkoxycarbonyloxy, the alkyl chains of the two last-mentioned radicals being optionally interrupted by from 1 to 4 oxygen atoms and/or phenyl- or phenoxy-substituted, halogen, hydroxyl and cyano.

When $R^1$ in the formula I is alkyl interrupted by oxygen atoms, preference is given to those alkyl radicals which are interrupted by from 1 to 4 oxygen atoms, in particular by 1 or 2 oxygen atoms.

When $R^1$ in the formula I is substituted phenyl, possible substituents are for example $C_1$–$C_8$-alkyl, $C_1$–$C_8$-alkoxy, halogen, in particular chlorine or bromine, and carboxyl.

$R^2$ can be derived for example from the components of the benzene, indole, quinoline, aminonaphthalene, pyrrole, aminothiazole, benzimidazole, benzothiazole, aminothiophene or diaminopyridine series.

Important radicals $R^2$ are for example those of the formulae IIa to IIu

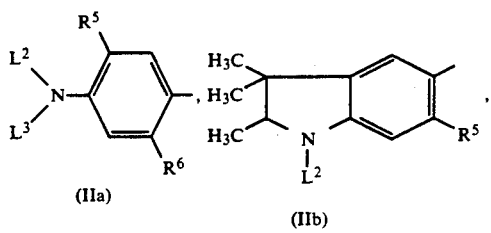

(IIa) (IIb)

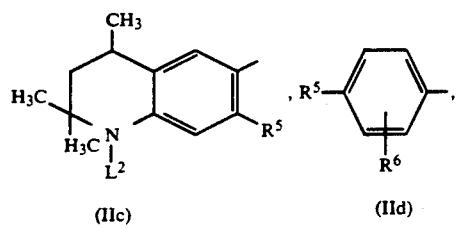

(IIc) (IId)

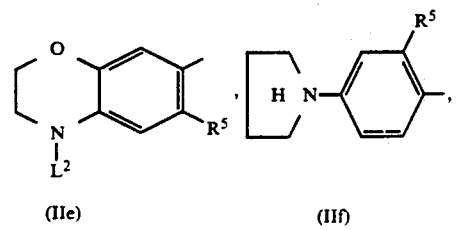

(IIe) (IIf)

-continued

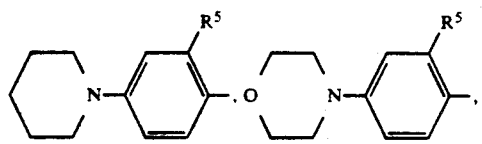

(IIg)　(IIh)

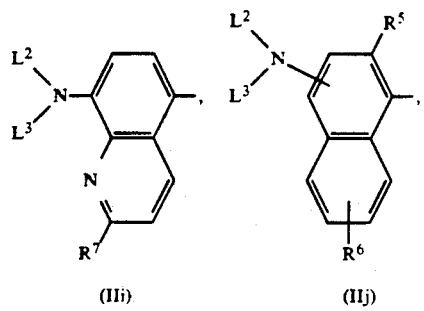

(IIi)　(IIj)

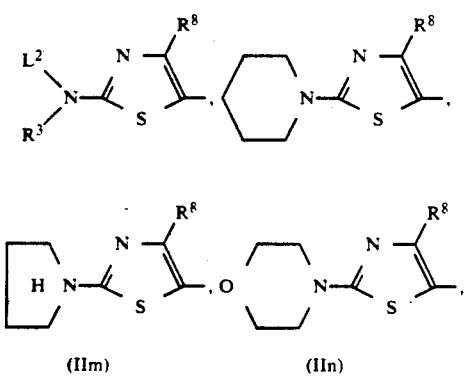

(IIm)　(IIn)

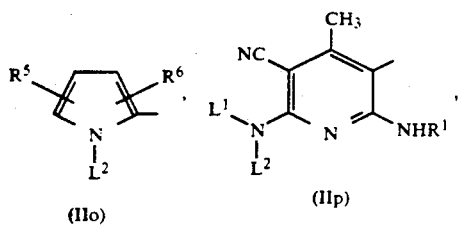

(IIo)　(IIp)

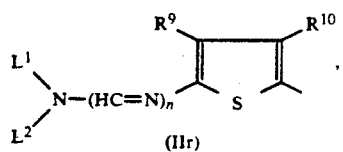

(IIr)

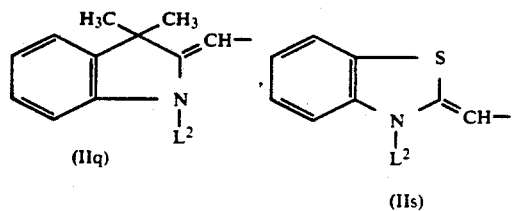

(IIq)　(IIs)

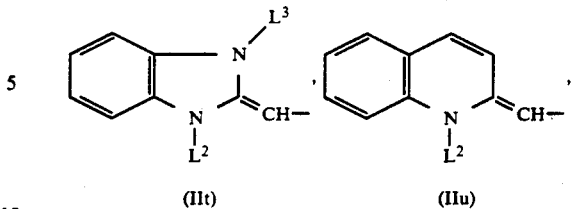

(IIt)　(IIu)

where
n is 0 or 1,
$L^2$ and $L^3$ are identical or different and each is independently of the other hydrogen or the abovementioned radical $R^1$,
$R^5$ and $R^6$ are identical or different and each is independently of the other hydrogen, hydroxyl, unsubstituted or phenyl- or $C_1$-$C_4$-alkylphenyl-substituted $C_1$-$C_8$-alkyl, unsubstituted or phenyl- or $C_1$-$C_4$-alkylphenyl-substituted $C_1$-$C_8$-alkoxy, $C_1$-$C_8$-alkanoylamino, $C_2$-$C_8$-alkylsulfonylamino or $C_1$-$C_8$-monoalkylaminosulfonylamino or -dialkylaminosulfonylamino,
$R^7$ is hydrogen or methyl,
$R^8$ is hydrogen, halogen, $C_1$-$C_8$-alkyl, unsubstituted or $C_1$-$C_4$-alkyl- or $C_1$-$C_4$-alkoxy-substituted phenyl, unsubstituted or $C_1$-$C_4$-alkyl- or $C_1$-$C_4$-alkoxysubstituted benzyl, cyclohexyl, thienyl, hydroxyl or $C_1$-$C_8$-monoalkylamino,
$R^9$ is cyano, carbamoyl, $C_1$-$C_8$-monoalkylcarbamoyl or -dialkylcarbamoyl or $C_1$-$C_8$-alkoxycarbonyl, and
$R^{10}$ is halogen, hydrogen, $C_1$-$C_4$-alkyl, $C_1$-$C_4$-alkoxy, $C_1$-$C_4$-alkylthio or unsubstituted or $C_1$-$C_4$-alkylsubstituted phenyl.

Any alkyl appearing in the abovementioned formulae is either straight-chain or branched.

$R^1$, $R^5$, $R^6$, $R^8$, $R^{10}$, $L^1$ and $L^2$ are each for example methyl, ethyl, propyl, isopropyl, butyl, isobutyl, secbutyl or tert-butyl.

$R^1$, $R^5$, $R^6$, $R^8$, $L^1$ and $L^2$ may each also be for example pentyl, isopentyl, neopentyl, tert-pentyl, hexyl, 2-methylpentyl, heptyl, 1-ethylpentyl, octyl, 2-ethylhexyl or isooctyl.

$R^1$ may also be for example nonyl, isononyl, decyl, isodecyl, undecyl, dodecyl, tridecyl, isotridecyl, tetradecyl, pentadecyl, hexadecyl, heptadecyl, octadecyl, nonadecyl, eicosyl (the designations isooctyl, isononyl, isodecyl and isotridecyl are trivial names which are derived from the alcohols obtained by the oxo process—cf. on this point Ullmanns Encyklopädie der technischen Chemie, 4th edition, volume 7, pages 215 to 217, and volume 11, pages 435 and 436).

$R^1$, $L^1$ and $L^2$ may each also be for example 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- or 4-butoxybutyl or 4,8-dioxadecyl.

$R^1$ may also be for example 3,6,9-trioxadecyl, 3,6,9-trioxaundecyl 1,3,6,9,12-tetraoxatridecyl 1,3,6,9,12-tetraoxatetradecyl, 2-carboxyethyl, 2-methoxycarbonylethyl, benzyl, 1- or 2-phenylethyl, 3-benzyloxypropyl, phenoxymethyl, 6-phenoxy-4-oxahexyl, 8- phenoxy-4-oxaoctyl, 2-, 3- or 4-chlorophenyl or 2-, 3- or 4-carboxylphenyl.

$R^3$ and $R^9$ are each for example methoxycarbonyl, ethoxycarbonyl, propoxycarbonyl, isopropoxycarbonyl, butoxycarbonyl, isobutoxycarbonyl or sec-butoxycarbonyl.

$R^9$ may also be for example mono- or dimethylcarbamoyl, mono- or diethylcarbamoyl, mono- or dipropylcarbamoyl, mono- or diisopropylcarbamoyl, mono- or dibutylcarbamoyl or N-methyl-N-butylcarbamoyl.

$R^5$, $R^6$ and $R^{10}$ may each also be for example methoxy, ethoxy, propoxy, isopropoxy, butoxy, isobutoxy or sec-butoxy.

$R^{10}$ may also be for example methylthio, ethylthio, propylthio, isopropylthio, butylthio, isobutylthio or sec-butylthio.

$R^1$, $R^8$ and $R^{10}$ may each also be for example phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl or 2,4-dimethylphenyl.

$R^1$ and $R^8$ may each also be for example 2-, 3- or 4-methoxyphenyl, 2-, 3- or 4-ethoxyphenyl, 2-, 3- or 4-isobutoxyphenyl or 2,4-dimethoxyphenyl.

$R^1$ may also be for example 2-cyanoethyl, 4-cyanobutyl, 2-hydroxyethyl, 5-hydroxynonyl or a radical of the formula

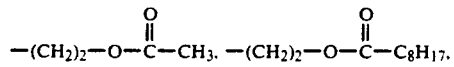

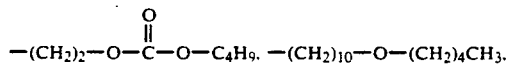

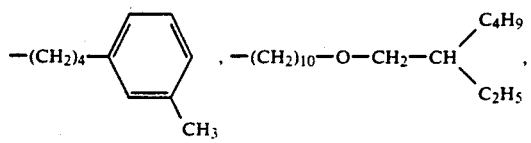

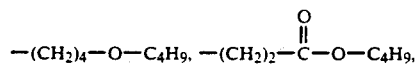

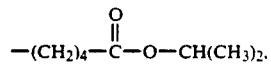

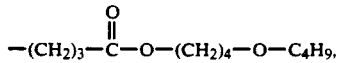

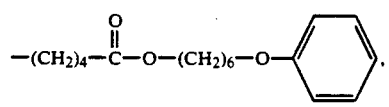

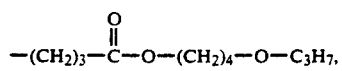

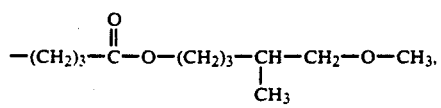

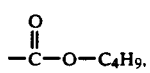

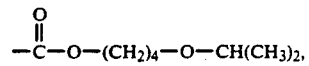

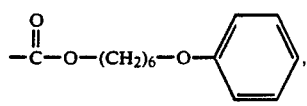

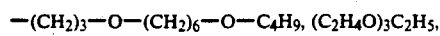

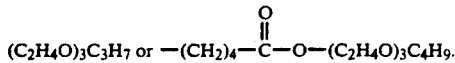

Preference is given to triazolopyridine dyes of the formula I where $R^3$ is cyano.

Preference is also given to triazolopyridine dyes of the formula I where $R^2$ is derived from a component of the benzene, indole, quinoline, aminonaphthalene, pyrrole, aminothiazole, benzimidazole, benzothiazole, aminothiophene or diaminopyridine series.

Preference is also given to triazolopyridine dyes of the formula I where $R^1$ is $C_1$-$C_{12}$-alkyl, which may be substituted by $C_1$-$C_6$-alkanoyloxy, $C_1$-$C_8$-alkoxycarbonyl (whose alkyl chains may each be interrupted by 1 or 2 oxygen atoms), phenyl or $C_1$-$C_4$-alkylphenyl and interrupted by 1 or 2 oxygen atoms.

Particular preference is given to triazolopyridine dyes of the formula I where $R^2$ is alkyl, alkoxyalkyl, alkanoyloxyalkyl or alkoxycarbonylalkyl, which may each have up to 12 carbon atoms, or is unsubstituted or methyl-substituted benzyl or unsubstituted or methyl-substituted phenyl.

Particular preference is also given to triazolopyridine dyes of the formula I where $R^2$ is a radical of the above-mentioned formula IIa, IIc, IIk, IIl, IIm or IIn, where $L^2$ and $L^3$ are each independently of the other alkyl, alkoxyalkyl, alkanoyloxyalkyl or alkoxycarbonylalkyl, which may each have up to 12 carbon atoms, or hydrogen, unsubstituted or methyl-substituted benzyl or unsubstituted or methyl-substituted phenyl, $R^5$ and $R^6$ are each independently of the other hydrogen, $C_1$-$C_4$-alkyl, $C_1$-$C_4$-alkoxy or $C_1$-$C_8$-alkanoylamino, and $R^8$ is hydrogen, $C_1$-$C_4$-alkyl, unsubstituted or $C_1$-$C_4$-alkyl- or $C_1$-$C_4$-alkoxy-substituted phenyl, benzyl or thienyl.

The dyes of the formula I according to the present invention can be prepared in a conventional manner.

For instance, those triazolopyridine dyes of the formula I where X is CH can be obtained by condensing aldehydes of the formula III $$R^2\text{—CHO} \qquad (III),$$

where $R^2$ is as defined above, with triazolopyridines of the formula IV

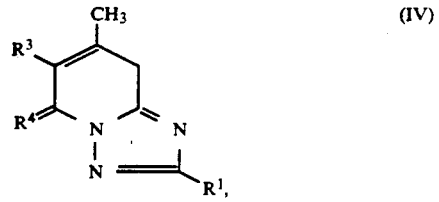

where $R^1$, $R^3$ and $R^4$ are each as defined above.

Those triazolopyridine dyes of the formula I where X is nitrogen can be obtained for example by condensing the nitroso compounds of the formula V

TI R²—NO (V), where R² is as defined above, or by oxidative coupling of the amino compounds of the formula VI

R²—NH₂ (VI), where R² is as defined above, with the triazolopyridines IV.

The triazolopyridines of the formula IV are likewise compounds known per se. Their preparation is described for example in earlier German Patent Application P 39 26 770.9.

It is a further object of the present invention to provide a process for the thermal transfer of dyes, a process wherein the dyes used should ideally have no application defects.

In the thermal transfer printing process, a transfer sheet which contains a thermally transferable dye in one or more binders, with or without suitable assistants, on a substrate is heated from the back with an energy source, for example a thermal printing head, in short heating pulses (duration: fractions of a second), as a result of which the dye migrates out of the transfer sheet and diffuses into the surface coating of a receiving medium. The essential advantage of this process is that the amount of dye to be transferred (and hence the color gradation) is easy to control by adjusting the energy supply to the heat source.

In general, color recording is carried out using the three subtractive primaries yellow, magenta and cyan (with or without black). To ensure optimal color recording, the dyes must have the following properties:

ready thermal transferability, little tendency to migrate within or out of the surface coating of the receiving medium at room temperature, high thermal and photochemical stability and also resistance to moisture and chemical substances, suitable hues for subtractive color mixing, a high molar absorption coefficient, resistance to crystallization on storage of the transfer sheet, ready industrial availability.

Experience shows that these requirements are very difficult to meet all at once.

For this reason most of the existing thermal transfer printing dyes fall short of the postulated ideal.

We have found that the object is achieved, and that the transfer of methine dyes by diffusion from a transfer to plastic-coated paper with the aid of an energy source is possible to advantageous effect, on using a transfer on which there is or are situated one or more dyes of the formula I and/or Ia

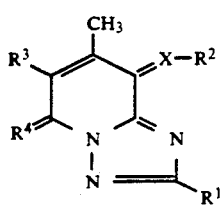
(I)

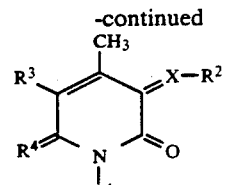
(Ia)

where
R¹ is C₁-C₂₀-alkyl, which may be substituted and interrupted by one or more oxygen atoms, or is substituted or unsubstituted phenyl or hydroxyl, R² is a 5- or 6-membered carbocyclic or heterocyclic ring which may be substituted and benzo fused, R³ is cyano, carbamoyl, carboxyl or C -C -alkoxycarbonyl, R⁴ is oxygen or a radical of the formula

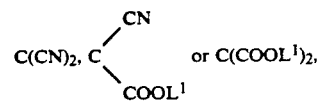

where L¹ is in each case C₁-C₈-alkyl which may be interrupted by 1 or 2 oxygen atoms, and X is CH or nitrogen.

A suitable energy source for the transfer of the dyes of the formula I and/or Ia by diffusion is for example a thermal printing head or a laser. The use of a thermal printing head is preferred.

Preference is given to the process involving the transfer of dyes of the formula I.

Preference is further given to the process involving the transfer of triazolopyridine dyes of the formula I where R³ is cyano.

Preference is further given to the process involving the transfer of triazolopyridine dyes of the formula I where R² is derived from a component of the benzene, indole, quinoline, aminonaphthalene, pyrrole, aminothiazole, benzimidazole, benzothiazole, aminothiophene or diaminopyridine series.

Preference is further given to the process involving the transfer of triazolopyridine dyes of the formula I where R¹ is C₁-C₁₂-alkyl, which may be substituted by C₁-C₆-alkanoyloxy, C₁-C₈-alkoxycarbonyl (whose alkyl chains may each be interrupted by 1 or 2 oxygen atoms), phenyl or C₁-C₄-alkylphenyl and interrupted by 1 or 2 oxygen atoms.

Particular preference is given to the process involving the transfer of triazolopyridine dyes of the formula I where R¹ is alkyl, alkoxyalkyl, alkanoyloxyalkyl or alkoxycarbonylalkyl, which may each have up to 12 carbon atoms, or is unsubstituted or methyl-substituted benzyl or unsubstituted or methyl-substituted phenyl.

Particular preference is further given to the process involving the transfer of triazolopyridine dyes of the formula I where R² is a radical of the abovementioned formula IIa, IIc, IIk, Ill, IIm or IIn, where L² and L³ are each independently of the other alkyl, alkoxyalkyl, alkanoyloxyalkyl or alkoxycarbonylalkyl, which may each have up to 12 carbon atoms, or hydrogen, unsubstituted or methyl-substituted benzyl or unsubstituted or methyl-substituted phenyl, R⁵ and R⁶ are each independently of the other hydrogen, C₁-C₄-alkyl, C₁-C₄-alkoxy or C₁-C₈-alkanoylamino, and $R^8$ is hydrogen, $C_1$–$C_4$-alkyl, unsubstituted or $C_1$–$C_4$-alkyl- or $C_1$–$C_4$-alkoxy-substituted phenyl, benzyl or thienyl.

To prepare the transfer required for the process, the dyes are incorporated into suitable organic solvents, e.g. chlorobenzene, isobutanol, methyl ethyl ketone, methylene chloride, toluene, tetrahydrofuran or a mixture thereof, together with one or more binders and with or without the addition of other auxiliaries, to form a printing ink. It preferably contains the dye in a molecularly dispersed, i.e. dissolved, form. The printing ink is applied to the inert substrate by knife coating and the coating is dried in air. A suitable binder is any resin or polymer material which is soluble in organic solvents and capable of binding the dye to the inert substrate in such a way that it will not rub off. Preference here is given to those binders which, after the printing ink has dried in air, hold the dye in the form of a clear, transparent film without visible crystallization of the dye.

Examples of such binders are cellulose derivatives, eg. methylcellulose, ethylcellulose, ethylhydroxyethylcellulose, hydroxypropylcellulose, cellulose acetate or cellulose acetobutyrate, starch, alginates, allyl resins, vinyl resins, polyvinyl alcohol, polyvinyl acetate, polyvinyl butyrate and polyvinylpyrrolidones. It is also possible to use polymers and copolymers of acrylates or derivatives thereof, such as polyacrylic acid, polymethyl methacrylate or styrene-acrylate copolymers, polyester resins, polyamide resins, polyurethane resins or natural CH resins, such as gum arabic. Other suitable binders are described for example in DE-A-3 524 519.

The preferred binders are ethylcellulose, ethylhydroxyethylcellulose, polyvinyl butyrate and polyvinyl acetate.

The ratio of binder to dye is preferably within the range from 1:1 to 5:1 by weight.

Suitable assistants are for example release agents as described in EP-A-227 092, EP-A-192 435 and the patent applications cited therein and also in particular organic additives which stop the transfer dye from crystallizing in the course of storage or heating of the inked ribbon, for example cholesterol or vanillin.

Inert substrates are for example tissue, blotting or parchment paper or plastics films of high heat stability, for example uncoated or metal-coated polyester, polyamide or polyimide. The inert substrate may additionally be coated on the side facing the energy source with a lubricant, or slipping, layer in order to prevent adhesion of the energy source to the substrate material. Suitable lubricants are described for example in EP-A-216 483 and EP-A-227 095. The thickness of the substrate is in general from 3 to 30 μm, preferably from 5 to 10 μm.

Suitable dye receiver layers are basically all temperature stable plastic layers having an affinity for the dyes to be transferred and preferably glass transition temperatures ($T^g$) within the range 50° C.<$Tg$<100° C., e.g. modified polycarbonates and polyesters. Suitable recipes for the receiver layer composition are described in detail for example in EP-A-227 094, EP-A-133 012, EP-A-133 011, EP-A-111 004, JP-A-199 997/1986, JP-A-283 595/1986, JP-A-237 694/1986 and JP-A-127 392/1986.

Transfer is preferably effected, as described above, by means of a thermal printing head which must be heatable to ≧300° C. for dye transfer to take place within the time interval t: 0<t<15 msec. On heating, the dye migrates out of the transfer sheet and diffuses into the surface coating of the receiving medium.

Compared with the dyes used in existing processes, the novel dyes transferred in the process according to the present invention are in general notable for improved migration properties in the receiving medium at room temperature, readier thermal transferability, readier industrial availability, better resistance to moisture and chemical substances, higher color strength, better solubility, higher thermal and photochemical stability and in particular better purity of hue.

The purity of hue results from the steeper slope of the main absorption band and from the higher transparency in blue and green regions.

The novel dyes give complete coverage of the range from red to turquoise. Of particular interest here are magenta and cyan dyes which, owing to their remarkable brilliance, are suitable as primaries for subtractive color mixing.

Details concerning the preparation are given in the examples, in which percentages are by weight, unless otherwise stated.

The examples which follow illustrate the invention.

Preparation of the Dyes

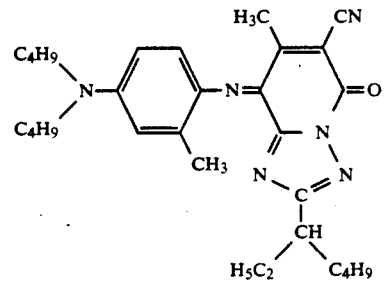

11 g of N,N-dibutyl-m-toluidine were nitrosated with sodium nitrite at 0° C. to 5° C. in aqueous hydrochloric acid. After 2 hours the mixture was rendered alkaline with 25% strength ammonia at 0°–10° C. and extracted with 150 ml of methylene chloride. The organic phase was then added with stirring to a suspension of 13.6 g of the compound of the formula

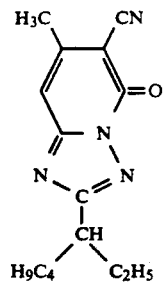

in acetic anhydride at room temperature. The reaction began immediately to give a slightly exothermic response (32° C.). The mixture was subsequently stirred at room temperature for a further 2 hours, heated to 40° C. and admixed with water to hydrolyse the acetic anhydride. The organic phase was extracted three times with water in a separating funnel and concentrated in a rotary evaporator. The residue was suspended in water, the suspension was neutralized with bicarbonate solution and filtered with suction, and the filter residue was washed until neutral and dried at room temperature.

Yield: 23.3 g=92% of theory

Melting point: 147° C. $\lambda_{max}$ (THF): 615 nm
$R_f$: 0.60 (8:2 toluene/ethyl acetate).

Example P1 was also followed to prepare the following dyes by in each case distilling off all the methylene chloride and carrying out the reaction at 120° C.

EXAMPLE P3

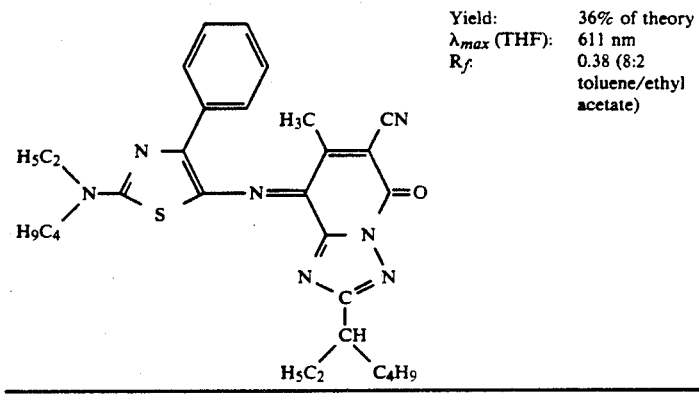

Yield: 36% of theory
$\lambda_{max}$ (THF): 611 nm
$R_f$: 0.38 (8:2 toluene/ethyl acetate)

EXAMPLE P4

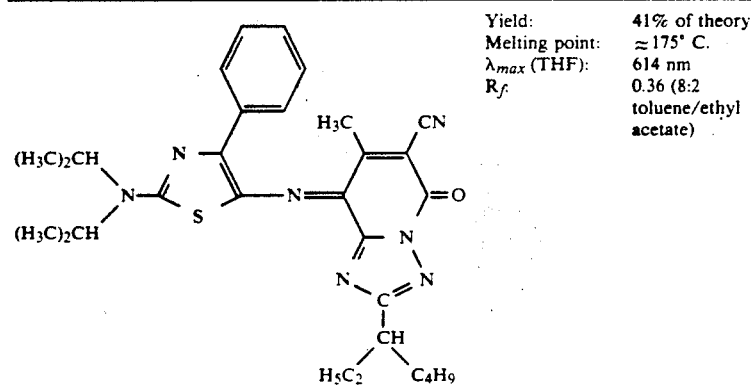

Yield: 41% of theory
Melting point: ≈175° C.
$\lambda_{max}$ (THF): 614 nm
$R_f$: 0.36 (8:2 toluene/ethyl acetate)

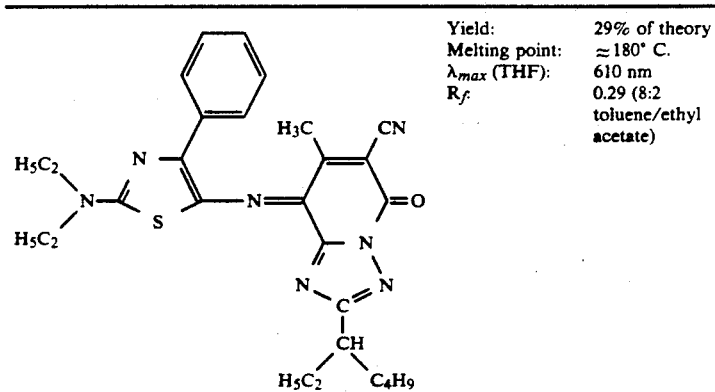

Yield: 29% of theory
Melting point: ≈180° C.
$\lambda_{max}$ (THF): 610 nm
$R_f$: 0.29 (8:2 toluene/ethyl acetate)

EXAMPLE p5

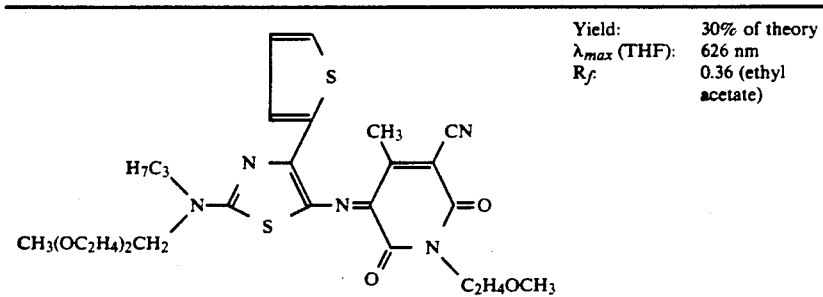

| | |
|---|---|
| Yield: | 30% of theory |
| $\lambda_{max}$ (THF): | 626 nm |
| $R_f$: | 0.36 (ethyl acetate) |

EXAMPLE P6

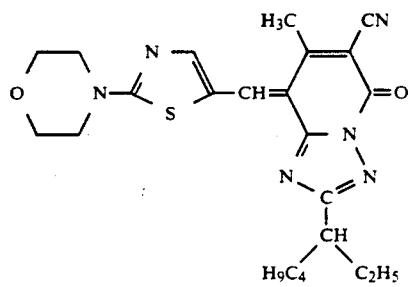

8.3 g of 2-morpholino-5-formylthiazole and 13.6 g of the compound of the formula

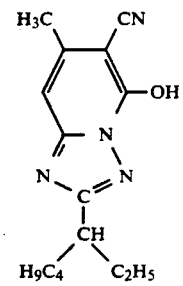

were dissolved in 100 ml of methylene chloride. After 100 ml of acetic anhydride had been added, the methylene chloride was distilled off and the temperature was increased to 120° C. After cooling to 100° C. with stirring, the target product precipitated. Following addition of 100 ml of methanol, the mixture was stirred overnight and filtered with suction, and the filter residue was washed with methanol and dried.

Yield: 17.1 g = 76% of theory
Melting point: >210° C.
$\lambda_{max}$ (THF): 531 nm
$R_f$: 0.45 (ethyl acetate)

Example P6 was also followed to synthesize the following dyes:

EXAMPLE P7

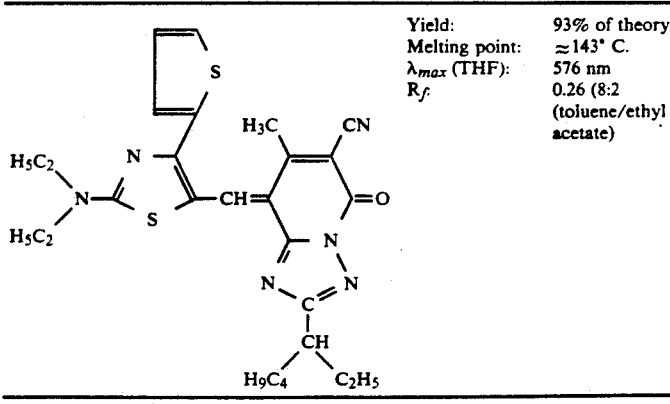

| | |
|---|---|
| Yield: | 93% of theory |
| Melting point: | ≈143° C. |
| $\lambda_{max}$ (THF): | 576 nm |
| $R_f$: | 0.26 (8:2 (toluene/ethyl acetate) |

EXAMPLE P8

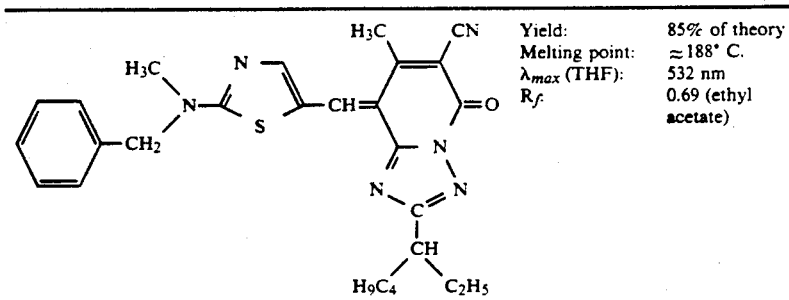

Yield: 85% of theory
Melting point: ≈188° C.
$\lambda_{max}$ (THF): 532 nm
$R_f$: 0.69 (ethyl acetate)

EXAMPLE P9

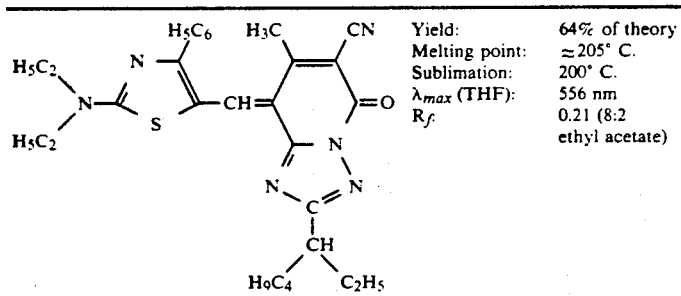

Yield: 64% of theory
Melting point: ≈205° C.
Sublimation: 200° C.
$\lambda_{max}$ (THF): 556 nm
$R_f$: 0.21 (8:2 ethyl acetate)

EXAMPLE P10

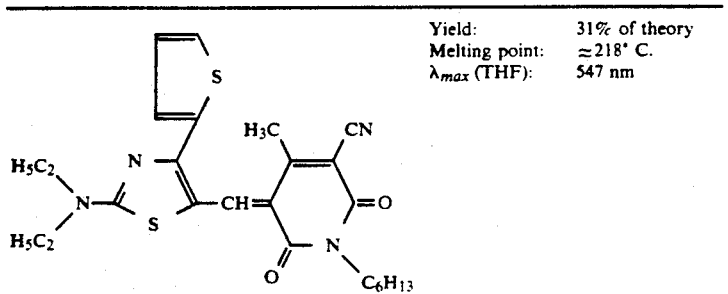

Yield: 31% of theory
Melting point: ≈218° C.
$\lambda_{max}$ (THF): 547 nm

EXAMPLE P11

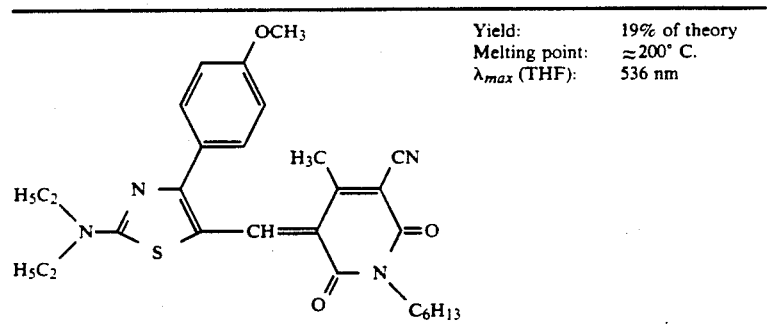

Yield: 19% of theory
Melting point: ≈200° C.
$\lambda_{max}$ (THF): 536 nm

*) Examples P10 and P11 were each carried out using a moist mixture of

EXAMPLE P12

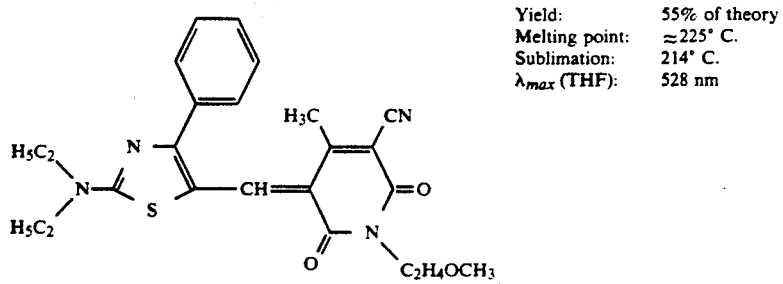

Yield: 55% of theory
Melting point: ≈225° C.
Sublimation: 214° C.
$\lambda_{max}$ (THF): 528 nm

Transfer of the Dyes

To be able to test the transfer characteristics of the dyes in a quantitative and simple manner, the heat transfer process was carried out with large hotplates instead of a thermal printing head, the transfer hotplates instead of a thermal printing head, the transfer temperature being varied within the range 70° C.<T<120° C. and the transfer time being set at 2 minutes.

A) General recipe for coating the substrates with dye 1 g of binder were dissolved in 8 ml (8:2 v/v) of toluene/ethanol at from 40° to 50° C. A solution of 0.25 g of dye with or without assistants in 5 ml of tetrahydrofuran was added by stirring. The print paste thus obtained was applied with an 80 μm knife to a sheet of polyester film (thickness: 6-10 μm) and dried with a hairdrier.

B) Testing of thermal transferability

The dyes used were tested in the following manner: The polyester sheet donor containing the dye under test in the coated front was placed face down on a sheet of commercial Hitachi Color Video Print Paper (receiver) and pressed down. Donor/receiver were then wrapped in aluminum foil and heated between two hot plates at different temperatures T (within the temperature range 70° C.<T<120° C.). The amount of dye diffusing into the bright plastic layer of the receiver is proportional to the optical density (=absorbance A). The latter was determined photometrically. If the logarithm of the absorbance A of the colored receiver papers measured within the temperature range from 80° C. to 110° C. is plotted against the corresponding reciprocal of the absolute temperature, the result is a straight line whose slope gives the activation energy $\Delta E_T$ for the transfer experiment:

$$\Delta E_T = 2.3 \times R \times \frac{\Delta \log A}{\Delta \left[\frac{1}{T}\right]}$$

To complete the characterization, it is additionally possible to infer from the plots the temperature T*[° C] at which the absorbance A of the colored receiver papers attains the value 1.

The dyes listed in the tables which follow were processed according to A), and the resulting dye-coated substrates were tested in respect of their transfer characteristics according to B). The tables list in some instances the thermal transfer parameters T* and $\Delta E_T$, the absorption maxima of the dyes $\lambda_{max}$ (measured in methylene chloride, unless otherwise stated) and the binders used. The weight ratio of dye:binder is always 1:4. In those cases where an assistant is present, the weight ratio of dye:assistant is 1:0.75.

The following abbreviations apply:

B=binder (EC=ethylcellulose, EHEC=ethylhydroxyethylcellulose, AC=cellulose acetobutyrate, M=mixture of polyvinyl butyrate and ethylcellulose in a weight ratio of 2:1)

A assistant (chol=cholesterol).

TABLE 1

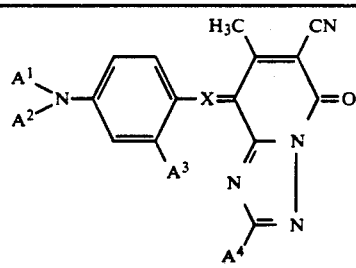

| Ex. Nr. | $A^1$ | $A^2$ | $A^3$ | X | $A^4$ | λ[nm] | B | A | T* [°C.] | $\Delta E_T \left[\frac{kcal}{mol}\right]$ |
|---|---|---|---|---|---|---|---|---|---|---|
| 1 | CH$_3$ | CH(CH$_3$)$_2$ | H | N | CH(C$_2$H$_5$)(C$_4$H$_9$) | 610 | M | — | 108 | 15 |
| 2 | C$_2$H$_5$ | C$_6$H$_{13}$ | H | N | CH(C$_2$H$_5$)(C$_4$H$_9$) | 610 | M | — | 89 | 15 |

TABLE 1-continued

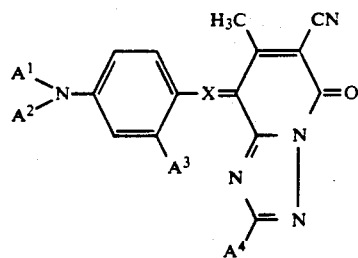

| Ex. Nr. | $A^1$ | $A^2$ | $A^3$ | X | $A^4$ | λ[nm] | B | A | T* [°C.] | $\Delta E_T \left[\frac{kcal}{mol}\right]$ |
|---|---|---|---|---|---|---|---|---|---|---|
| 3 | C₄H₉ | C₄H₉ | CH₃ | N | CH(C₂H₅)(C₄H₉) | 623 | M | — | 90 | 17 |
| 4 | C₂H₅ | C₄H₉ | CH₃ | N | CH(C₂H₅)(C₄H₉) | 621 | M | — | 89 | 16 |
| 5 | C₄H₉ | C₄H₉ | CH₃ | N | CH(C₃H₇)(C₄H₉) | 621 | M | — | 91 | 16 |
| 6 | C₄H₉ | C₂H₄CN | H | N | CH(C₂H₅)(C₄H₉) | 590 | M | — | 111 | 14 |
| 7 | C₂H₅ | C₂H₅ | NHCOCH₃ | N | CH(C₂H₅)(C₄H₉) | 619 | M | — | 87 | 19 |
| 8 | C₂H₅ | C₂H₅ | NHCOCH₃ | N | CH(C₃H₇)(C₄H₉) | 619 | M | — | 89 | 18 |
| 9 | C₂H₅ | C₄H₉ | NHCOCH₃ | N | C₃H₆OC₂H₄OC₄H₉ | 620 | EHEC | — | 93 | 18 |
| 10 | C₄H₉ | C₄H₉ | NHCOCH₃ | N | CH(C₂H₅)(C₄H₉) | 623 | M | — | 110 | 15 |
| 11 | C₂H₅ | C₂H₅ | NHSO₂N(CH₃)₂ | N | CH(C₂H₅)(C₄H₉) | 618 | M | — | 90 | 14 |
| 12 | C₂H₅ | C₂H₅ | H | CH | CH(C₂H₅)(C₄H₉) | 559 | M | — | 89 | 11 |
| 13 | CH₃ | CH₃ | H | CH | CH(C₂H₅)(C₄H₉) | 554 | M | — | 112 | 16 |
| 14 | C₄H₉ | C₂H₅ | OCH₃ | CH | CH(C₂H₅)(C₄H₉) | | AC | Chol | 87 | 13 |
| 15 | C₄H₉ | C₂H₅ | OCH₃ | N | C₄H₈OC₃H₇ | | EC | — | 92 | 16 |

TABLE 2
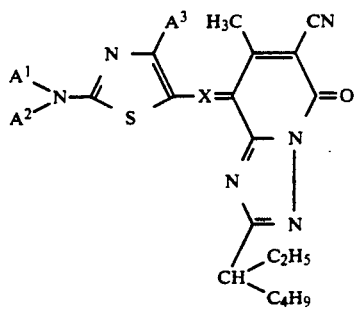
| Ex. Nr. | $A^1$ | $A^2$ | $A^3$ | X | λ[nm] | B | A | T* [°C.] | $\Delta E_T \left[\frac{kcal}{mol}\right]$ |
|---|---|---|---|---|---|---|---|---|---|
| 16 | $C_2H_5$ | $C_4H_9$ | $C_6H_5$ | N | 612 | M | — | 86 | 16 |
| 17 | $C_2H_5$ | $C_2H_5$ | $C_6H_5$ | N | 615 | M | — | 82 | 16 |
| 18 | $CH(CH_3)_2$ | $CH(CH_3)_2$ | $C_6H_5$ | N | 617 | M | — | 90 | 17 |
| 19 | $C_2H_5$ | $C_2H_5$ | —C₆H₄—OCH₃ | N | 624 | M | — | 90 | 13 |
| 20 | $C_2H_5$ | $C_2H_5$ | —C₆H₄—SO₂—N(C₂H₄OCH₃)₂ | N | 621 | M | — | 92 | 12 |
| 21 | $C_2H_5$ | $C_4H_9$ | —C₆H₄—CH₃ | N | 612 | M | — | 84 | 17 |
| 22 | $C_2H_5$ | $C_4H_9$ | 2,3-dimethylphenyl | N | 611 | M | — | 85 | 16 |
| 23 | $C_2H_5$ | $C_2H_5$ | $C_6H_5$ | CH | 560 | M | — | 85 | 12 |
| 24 | $C_2H_5$ | $C_2H_5$ | Thien-2-yl | CH | 579 | M | — | 90 | 16 |
| 25 | Benzyl | $CH_3$ | H | CH | 537 | M | — | 88 | 8 |
| 26 | $C_4H_9$ | $C_2H_5$ | $C_6H_5$ | CH | 561 | M | — | 90 | 12 |
| 27 | $C_2H_5$ | $C_2H_5$ | —C₆H₄—OCH₃ | CH | 566 | M | — | 109 | 10 |

TABLE 3
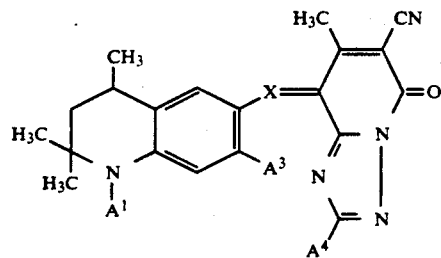
| Ex. No. | $A^1$ | $A^3$ | X | $A^4$ | λ[nm] | B | A | T* [°C] | $\Delta E_T \left[\frac{kcal}{mol}\right]$ |
|---|---|---|---|---|---|---|---|---|---|
| 28 | $C_2H_4OC_4H_9$ | H | N | CH(C_2H_5)(C_4H_9) | 631 | M | — | 110 | 24 |
| 29 | $C_6H_{13}$ | H | N | CH(C_2H_5)(C_4H_9) | 636 | EC | Chol | 107 | 22 |
| 30 | $C_3H_7$ | $CH_3$ | N | $C_3H_6OC_2H_4OC_4H_9$ | 640 | EC | — | 100 | 16 |
| 31 | $C_2H_5$ | H | CH | CH(C_2H_5)(C_4H_9) | — | M | — | 98 | 15 |
| 32 | $C_2H_4OC_4H_9$ | $CH_3$ | CH | CH(C_2H_5)(C_4H_9) | — | EC | — | 100 | 16 |
| 33 | H | $NHCOCH_3$ | N | CH(C_2H_5)(C_4H_9) | 616 | M | — | 98 | 14 |
TABLE 4
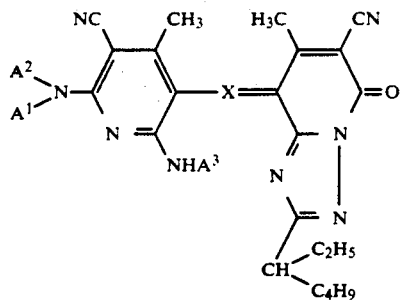
| Ex. No. | $A^1$ | $A^2$ | $A^3$ | X | λ[nm] | B | A | T* [°C] | $\Delta E_T \left[\frac{kcal}{mol}\right]$ |
|---|---|---|---|---|---|---|---|---|---|
| 34 | H | $CH(CH_3)_2$ | $CH(CH_3)_2$ | N | 608 | N | — | 101 | 16 |
| 35 | $C_2H_5$ | $C_3H_6OCH_3$ | $C_3H_6OCH_3$ | N | 619 | N | — | 94 | 17 |

TABLE 5

| | 36 | CH₂ | C₆H₅ | N | 616 | M | — | 90 | 14 |
| | 37 | O | C₆H₅ | N | 612 | M | — | 92 | 15 |
| | 38 | O | H | CH | 537 | M | — | 87 | 13 |

TABLE 6

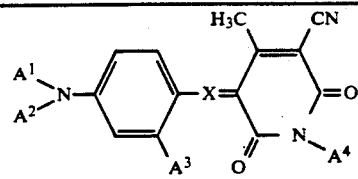

| Ex. No. | A¹ | A² | A³ | X | A⁴ | λ[nm] | B | A | T* [°C.] | ΔE$_T$ [kcal/mol] |
|---|---|---|---|---|---|---|---|---|---|---|
| 39 | C₂H₅ | C₂H₅ | NHCOCH₃ | N | 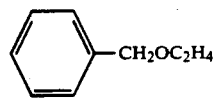 —CH₂OC₂H₄ | 593 | EC | — | 129 | 15 |
| 40 | C₂H₅ | C₂H₅ | NHCOCH₃ | N | 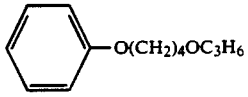 —O(CH₂)₄OC₃H₆ | 593 | EC | — | 121 | 13 |
| 41 | C₂H₅ | C₂H₅ | OCH₃ | N | 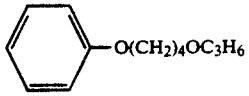 —O(CH₂)₄OC₃H₆ | 570 | EC | — | 127 | 10 |
| 42 | C₂H₅ | C₂H₅ | OCH₃ | N | 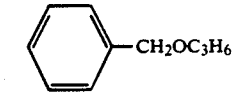 —CH₂OC₃H₆ | 570 | EC | — | 117 | 10 |
| 43 | C₂H₅ | C₂H₅ | H | CH | C₆H₁₃ | 528 | M | — | 78 | 14 |

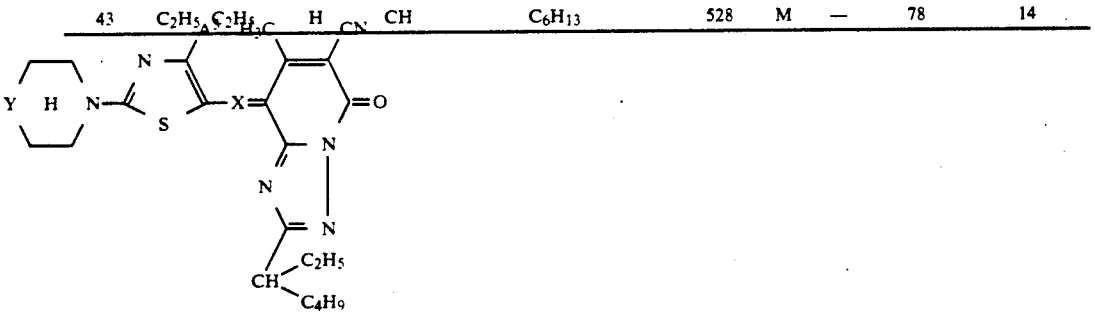

| Ex. No. | Y | A³ | X | λ[nm] | B | A | T* [°C.] | ΔE$_T$ [kcal/mol] |
|---|---|---|---|---|---|---|---|---|

TABLE 7

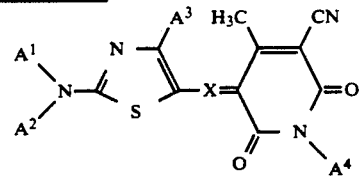

| Ex. No. | A¹ | A² | A³ | X | A⁴ | λ[nm] | B | A | T* [°C.] | ΔE$_T$ [kcal/mol] |
|---|---|---|---|---|---|---|---|---|---|---|
| 44 | C₃H₇ | CH₂(C₂H₄O)₂CH₃ | 2-Thienyl | N | C₂H₄OCH₃ | 626* | EC | — | 100 | 14 |
| 45 | C₂H₅ | (C₂H₄O)₂C₂H₅ | C₆H₅ | N | C₃H₆OC₂H₅ | 584* | M | — | 94 | 13 |
| 46 | C₃H₇ | CH₂(C₂H₄O)₂CH₃ | 2-Thienyl | N | C₃H₆OCH₃ | 624* | M | — | 98 | 12 |
| 47 | C₂H₅ | (C₂H₄O)₃C₂H₅ | C₆H₅ | N | C₂H₄OCH₃ | 584* | EC | — | 94 | 14 |
| 48 | C₂H₅ | (C₂H₄O)₃C₂H₅ | C₆H₅ | N | C₃H₆OCH₃ | 584* | M | — | 96 | 13 |
| 49 | C₂H₅ | CH₂(C₂H₄O)₂CH₃ | C₆H₅ | N | C₂H₄OCH₃ | 585* | M | — | 97 | 14 |
| 50 | C₂H₅ | C₂H₅ | C₆H₅ | CH | C₂H₄OCH₃ | 534 | M | — | 91 | 13 |
| 51 | C₂H₅ | C₂H₅ | 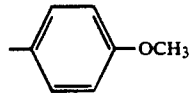 —OCH₃ | CH | C₆H₁₃ | 537 | M | — | 84 | 18 |

TABLE 7-continued

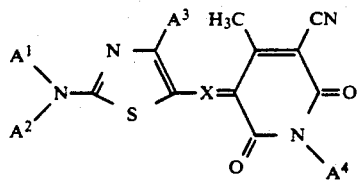

| Ex. No. | $A^1$ | $A^2$ | $A^3$ | X | $A^4$ | λ[nm] | B | A | T* [°C] | $\Delta E_T \left[\frac{kcal}{mol}\right]$ |
|---|---|---|---|---|---|---|---|---|---|---|
| 52 | $C_2H_5$ | $C_2H_5$ | Thien-2-y | CH | $C_6H_{13}$ | 551 | M | — | 88 | 19 |

*$\lambda_{max}$ was measured in THF

TABLE 8

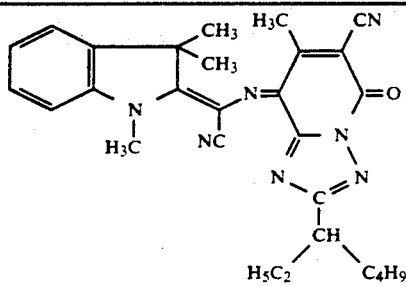

| Ex. No. | λ[nm] | B | A | T* [°C] | $\Delta E_T \left[\frac{kcal}{mol}\right]$ |
|---|---|---|---|---|---|
| 53 | 590 | M | — | 99 | 12 |

Similar results are obtained with the dyes listed in Table 9. (The roman numerals under D refer to the abovementioned radicals of the formula II).

TABLE 9

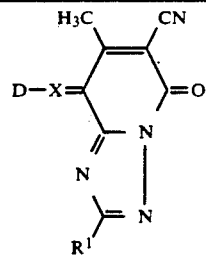

| Ex. No. | D | X | $L^2$ | $R^1$ | $L^3$ | $R^5$ | $R^6$ | Hue |
|---|---|---|---|---|---|---|---|---|
| 54 | IIa | CH | $C_4H_9$ | CH(CH₃)₂ | $C_2H_5$ | H | H | Magenta violet |
| 55 | IIa | CH | $C_2H_5$ | $C_2H_5$ | $C_3H_7$ | H | H | Magenta violet |
| 56 | IIa | CH | $C_2H_4CO_2C_2H_5$ | $C_4H_8OCH_3$ | $C_2H_5$ | H | H | Magenta |
| 57 | IIa | CH | $C_2H_5$ | $C_3H_6OC_4H_9$ | $C_2H_5$ | H | $CH_3$ | Magenta violet |
| 58 | IIa | CH | $CH(CH_3)_2$ | CH($C_2H_5$)($C_4H_9$) | $CH(CH_3)_2$ | H | $OCH_3$ | Magenta violet |
| 59 | IIa | CH | $C_4H_9$ | $(CH_2)_2CH(C_2H_5)(CH_3)$ | $C_2H_5$ | H | $CH_3$ | Magenta violet |
| 60 | IIa | CH | $C_4H_9$ | $C_7H_{15}$ | $C_2H_5$ | H | $NHCOCH_3$ | Magenta |

TABLE 9-continued

| Ex.-No. | D | X | L² | R¹ | L⁴ | R⁶ | R⁵ | Hue |
|---|---|---|---|---|---|---|---|---|
| 61 | IIa | CH | $C_3H_7$ | $(CH_2)_2CO_2C_4H_9$ | $C_3H_6OCH_3$ | H | H | violet Magenta |
| 62 | IIa | N | $C_4H_9$ | $(CH_2)_2CO_2C_4H_9$ | $C_4H_9$ | H | H | Cyan |
| 63 | IIa | N | $C_2H_5$ | $C_3H_6OC_2H_4OCH_3$ | $C_2H_5$ | H | $C_2H_5$ | Cyan |
| 64 | IIa | N | $C_2H_5$ | $CH(CH_3)_2$ | $C_3H_7$ | H | $CH_3$ | Cyan |
| 65 | IIa | N | $CH(CH_3)_2$ | $(CH_2)_4OC_3H_7$ | $C_2H_5$ | H | $C_2H_5$ | Cyan |
| 66 | IIa | N | $C_4H_9$ | $CH(C_3H_7)(C_4H_9)$ | $C_2H_5$ | H | $NHCOCH_3$ | Cyan |
| 67 | IIa | N | $C_3H_7$ | $CH(C_2H_5)(C_4H_9)$ | $C_2H_5$ | H | $NHSO_2C_4H_9$ | Cyan |
| 68 | IIa | N | $C_2H_5$ | $C_2H_4OC_4H_9$ | $C_7H_{15}$ | H | $NHSO_2C_2H_5$ | Cyan |
| 69 | IIa | N | H | $CH(C_2H_5)(C_4H_9)$ | $C_4H_9$ | $OCH_3$ | $CH_3$ | Cyan |
| 70 | IIa | N | $C_2H_4CN$ | $(CH_2)_2OC_6H_{13}$ | $C_4H_9$ | H | $CH_3$ | Cyan |
| 71 | IIa | N | H | $CH(C_2H_5)(C_4H_9)$ | $C_5H_{11}$ | $OC_2H_5$ | $CH_3$ | Cyan |
| 72 | IIb | CH | $C_2H_5$ | $CH(C_2H_5)(C_4H_9)$ | — | — | H | Magenta violet |
| 73 | IIb | CH | $C_4H_9$ | $(CH_2)_4OC_4H_9$ | — | — | H | violet |
| 74 | IIb | N | $C_2H_5$ | $CH(C_2H_5)(C_4H_9)$ | — | — | H | Cyan |
| 75 | IIc | CH | $C_4H_9$ | $(C_2H_4O)_2C_4H_9$ | — | — | H | Magenta violet |
| 76 | IIc | CH | $C_3H_6OC_4H_9$ | $CH(C_2H_5)(C_4H_9)$ | — | — | H | Magenta violet |
| 77 | IIc | CH | $C_2H_5$ | $(C_2H_4O)_2C_4H_9$ | — | — | H | Magenta violet |
| 78 | IIc | CH | $C_2H_5$ | $C_3H_6OC_2H_4OC_6H_5$ | — | — | $CH_3$ | violet |
| 79 | IIc | CH | $C_4H_9$ | $(CH_2)_2CO_2C_5H_{11}$ | — | — | $OCH_3$ | violet |
| 80 | IIc | CH | $C_2H_5$ | $(CH_2)_2OC_5H_{11}$ | — | — | $C_2H_5$ | violet |
| 81 | IIc | CH | $C_2H_4CN$ | $(CH_2)_2OC_5H_{11}$ | — | — | H | Magenta |
| 82 | IIc | CH | $C_2H_4OH$ | $(C_2H_4O)_2C_4H_9$ | — | — | $CH_3$ | Magenta |
| 83 | IIc | CH | $C_2H_4CO_2C_2H_5$ | $(C_2H_4O)_2C_4H_9$ | — | — | H | Magenta |
| 84 | IIc | N | $(C_2H_4O)_2C_4H_9$ | $CH(C_2H_5)(C_4H_9)$ | — | — | H | Cyan |
| 85 | IIc | N | $C_2H_5$ | $(CH_2)_4OC_3H_6OC_2H_5$ | — | — | $CH_3$ | Cyan Turquoise |
| 86 | IIc | N | $C_4H_9$ | $CH_3$ | — | — | H | Cyan |
| 87 | IIc | N | H | $C_4H_8OC_3H_6OC_4H_9$ | — | — | $CH_3$ | Cyan |

TABLE 9-continued

| | | | | | | | | | |
|---|---|---|---|---|---|---|---|---|---|
| 88 | IIc | N | C$_3$H$_7$ | CH(C$_6$H$_{13}$)(C$_4$H$_9$) | — | — | NHCOCH$_3$ | Cyan Turquoise |
| 89 | IIc | N | C$_2$H$_4$CN | C$_3$H$_6$OC$_2$H$_4$OC$_4$H$_9$ | — | — | CH$_3$ | Cyan |
| 90 | IIc | N | C$_3$H$_6$ | (C$_2$H$_4$O)$_2$C$_4$H$_9$ | — | — | H | Cyan |
| 91 | IIc | N | C$_2$H$_5$ | C$_2$H$_4$CO$_2$C$_7$H$_{15}$ | — | — | CH$_3$ | Cyan Turquoise |
| 92 | IIc | N | C$_2$H$_4$OH | C$_3$H$_6$OC$_3$H$_6$OC$_2$H$_5$ | — | — | H | Cyan |
| 93 | IId | CH | — | CH(C$_2$H$_5$)(C$_4$H$_9$) | — | H | H | Yellow |
| 94 | IId | CH | — | C$_3$H$_6$OC$_4$H$_9$ | — | m-CH$_3$ | OC$_2$H$_5$ | Yellow |
| 95 | IId | CH | — | CH(C$_2$H$_5$)(C$_4$H$_9$) | — | m-CO$_2$C$_6$H$_{13}$ | H | Yellow |

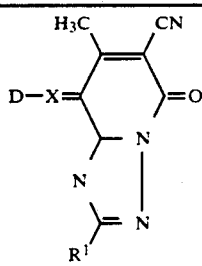

| Ex.-No. | D | X | L$^2$ | R$^1$ | L$^3$ | R$^6$ | R$^5$ | Hue |
|---|---|---|---|---|---|---|---|---|
| 96 | IIe | CH | C$_3$H$_6$OC$_4$H$_9$ | CH(C$_2$H$_5$)(C$_4$H$_9$) | — | — | CH$_3$ | Magenta violet |
| 97 | IIe | N | C$_3$H$_7$ | C$_3$H$_6$OC$_2$H$_4$CH(C$_2$H$_5$)(C$_4$H$_9$) | — | — | H | Cyan Turquoise |
| 98 | IIe | N | CH(C$_2$H$_5$)(C$_4$H$_9$) | CH(C$_4$H$_9$)(C$_2$H$_5$) | — | — | CH$_3$ | Turquoise |
| 99 | IIg | CH | — | CH(C$_2$H$_5$)(C$_4$H$_9$) | — | — | H | Magenta violet |
| 100 | IIg | CH | — | C$_3$H$_6$OC$_2$H$_4$OC$_6$H$_5$ | — | — | CH$_3$ | violet |
| 101 | IIg | N | — | C$_3$H$_6$OC$_2$H$_4$OC$_4$H$_9$ | — | — | H | Cyan |
| 102 | IIg | N | — | CH(C$_2$H$_5$)(C$_5$H$_{11}$) | — | — | CH$_3$ | Cyan Turquiose |
| 103 | IIg | N | — | C$_3$H$_6$OC$_3$H$_7$ | — | — | NHCOCH$_3$ | Cyan Turquoise |

TABLE 10

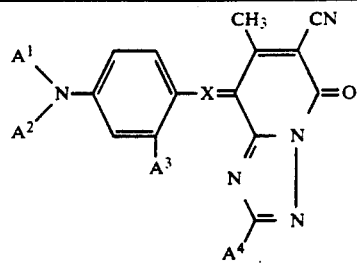

| Ex.-No. | $A^1$ | $A^2$ | $A^3$ | X | $A^4$ | λ[mm] | B | A | T*[°C.] | $\Delta E_T \left[\frac{kcal}{mol}\right]$ |
|---|---|---|---|---|---|---|---|---|---|---|
| 104 | CH(CH$_3$)$_2$ | C$_2$H$_5$ | CH$_3$ | N | CH(C$_2$H$_5$)(C$_4$H$_9$) | 621 | EHEC | — | 96 | 12 |
| 105 | C$_3$H$_7$ | C$_2$H$_5$ | CH$_3$ | N | CH(C$_2$H$_5$)(C$_4$H$_9$) | 621 | EHEC | — | 111 | 14 |
| 106 | C$_4$H$_9$ | C$_4$H$_9$ | NHCOC$_3$H$_7$ | N | CH(C$_2$H$_5$)(C$_4$H$_9$) | 625 | EHEC | — | 105 | 10 |
| 107 | —CH$_2$—C$_6$H$_5$ | C$_2$H$_5$ | H | CH | CH(C$_2$H$_5$)(C$_4$H$_9$) | 555 | EHEC | — | 100 | 9 |
| 108 | C$_2$H$_4$OCOCH$_2$OCH$_3$ | C$_2$H$_5$ | H | N | CH(C$_2$H$_5$)(C$_4$H$_9$) | 601 | M | — | 87 | 10 |
| 109 | C$_2$H$_4$Cl | C$_2$H$_5$ | H | N | CH(C$_2$H$_5$)(C$_4$H$_9$) | 595 | M | — | 84 | 9 |
| 110 | C$_2$H$_5$ | C$_2$H$_5$ | NHCO$_2$C$_2$H$_4$OC$_2$H$_5$ | N | CH(C$_2$H$_5$)(C$_4$H$_9$) | 616 | M | — | 76 | 10 |
| 111 | —CH$_2$—C$_6$H$_5$ | C$_2$H$_5$ | H | N | CH(C$_2$H$_5$)(C$_4$H$_9$) | 604 | M | — | 76 | 8 |
| 112 | C$_2$H$_4$OCOCH$_3$ | C$_2$H$_5$ | H | N | CH(C$_2$H$_5$)(C$_4$H$_9$) | 604 | EHEC | — | 104 | 10 |
| 113 | —CH$_2$—C$_6$H$_5$ | C$_2$H$_5$ | CH$_3$ | N | CH(C$_2$H$_5$)(C$_4$H$_9$) | 618 | M | — | 78 | 10 |
| 114 | C$_4$H$_9$ | C$_2$H$_5$ | CH$_3$ | N | CH(CH$_3$)(CH$_3$) | 618 | M | — | 94 | 11 |

TABLE 10-continued

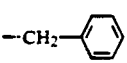

| Ex.-No. | A¹ | A² | A³ | X | A⁴ | λ[mm] | B | A | T*[°C.] | $\Delta E_T \left[\frac{kcal}{mol}\right]$ |
|---|---|---|---|---|---|---|---|---|---|---|
| 115 | C₄H₉ | C₄H₉ | CH₃ | N | CH(CH₃)CH₃ | 621 | M | — | 94 | 11 |
| 116 | —CH₂—C₆H₅ | C₂H₅ | CH₃ | N | CH(CH₃)CH₃ | 618 | M | — | 80 | 8 |
| 117 | C₄H₉ | C₄H₉ | H | N | C₃H₇ | 616 | M | — | 73 | 7 |
| 118 | C₂H₅ | C₂H₅ | OCH(CH₃)₂ | N | CH(C₂H₅)C₄H₉ | 601 | M | — | 82 | 9 |
| 119 | CH₃ | CH₃ | H | CH | CH(C₂H₅)C₄H₉ | 554 | M | — | 112 | 16 |
| 120 | C₂H₄OC₄H₉ | C₂H₅ | H | N | CH(C₂H₅)C₄H₉ | 615 | M | — | 109 | 11 |
| 121 | C₂H₄CN | C₄H₉ | H | N | CH(C₂H₅)C₄H₉ | 590 | M | — | 111 | 13 |
| 122 | C₄H₉ | C₄H₉ | H | N | CH₂—C₆H₅ | 620 | M | — | 110 | 12 |
| 123 | C₄H₉ | C₂H₅ | CH₃ | N | CH₂—C₆H₅ | 621 | M | — | 117 | 16 |
| 124 | C₄H₉ | C₂H₅ | CH₃ | N | CH₃ | 619 | M | — | 85 | 9 |
| 125 | C₄H₉ | C₄H₉ | CH₃ | N | C₂H₅ | 619 | M | — | 83 | 10 |
| 126 | C₄H₉ | C₂H₅ | CH₃ | N | C₂H₅ | 621 | M | — | 119 | 13 |
| 127 | C₄H₉ | C₄H₉ | CH₃ | N | CH₂—C₆H₅ | 625 | M | — | 88 | 12 |
| 128 | C₄H₉ | C₄H₉ | CH₃ | N | CH₃ | 621 | M | — | 108 | 10 |
| 129 | C₄H₉ | CH₃ | H | N | CH(C₂H₅)C₄H₉ | 607 | M | — | 82 | 9 |
| 130 | C₂H₅ | C₂H₅ | CH₃ | N | CH(C₂H₅)C₄H₉ | 615 | M | — | 83 | 11 |

TABLE 10-continued

| Ex.-No. | A¹ | A² | A³ | X | A⁴ | λ[mm] | B | A | T*[°C.] | $\Delta E_T \left[\frac{kcal}{mol}\right]$ |
|---|---|---|---|---|---|---|---|---|---|---|
| 131 | (CH₂)₂CH(CH₃)₂ | C₂H₅ | CH₃ | N | CH(C₂H₅)(C₄H₉) | 620 | EHEC | — | 92 | 13 |
| 132 | C₂H₄CH(CH₃)₂ | C₂H₅ | CH₃ | N | C(CH₃)₃ | 621 | M | — | 102 | 8 |
| 133 | CH₂CH(CH₃)₂ | C₄H₉ | H | N | C(CH₃)₃ | 615 | M | — | 83 | 11 |
| 134 | C₄H₉ | C₄H₉ | OCH₃ | N | CH(C₂H₅)(C₄H₉) | 603 | M | — | 98 | 6 |
| 135 | C₂H₄OCONHC₄H₉ | C₂H₅ | H | N | CH(C₂H₅)(C₄H₉) | 596 | M | — | 97 | 16 |
| 136 | C₂H₅ | C₂H₅ | H | N | CH(C₂H₅)(C₄H₉) | 608 | M | — | 97 | 14 |
| 137 | C₂H₅ | C₂H₅ | NHCOCH₂OCH₃ | N | CH(C₂H₅)(C₄H₉) | 622 | M | — | 93 | 8 |
| 138 | C₂H₄OC₂H₅ | C₂H₅ | NHCOCH₃ | N | CH(C₂H₅)(C₄H₉) | 623 | M | — | 88 | 8 |
| 139 | C₂H₅ | C₂H₅ | NHCOCH₂C₆H₅ | N | CH(C₂H₅)(C₄H₉) | 624 | M | — | 81 | 8 |
| 140 | C₂H₄O₂CCH₃ | C₂H₄O₂CH₃ | NHCOCH₂OCH₃ | N | CH(C₂H₅)(C₄H₉) | 615 | M | — | 82 | 8 |
| 141 | C₂H₄O₂CC₅ | C₂H₄O₂CC₂H₅ | NHCOC₂H₅ | N | CH(C₂H₅)(C₄H₉) | 616 | M | — | 83 | 10 |

TABLE 11

| Ex. No. | A¹ | A² | A³ | X | A⁴ | λ[mm] | B | A | T*[°C.] | $\Delta E_T \left[\frac{kcal}{mol}\right]$ |
|---|---|---|---|---|---|---|---|---|---|---|
| 142 | $C_2H_5$ | $C_2H_5$ | –C₆H₄–SO₂–N($C_2H_4OCH_3$)₂ | CH | CH($C_2H_5$)($C_4H_9$) | 563 | M | — | 155 | 3 |
| 143 | $C_2H_5$ | $C_2H_5$ | –C₆H₄–OC₂H₄CN | N | CH($C_2H_5$)($C_4H_9$) | 623 | M | — | 101 | 10 |

TABLE 12

| Ex. No. | D | X | $L^2$ | $R^1$ | $L^3$ | Y | $R^5$ | $R^6$ | $R^8$ | $\lambda_{max}$ (nm) |
|---|---|---|---|---|---|---|---|---|---|---|
| 144 | IIa | N | $CH_3$ | CH($C_2H_5$)($C_4H_9$) | $CH_3$ | $CO_2C_4H_9$ | H | H | — | 680 |
| 145 | IIa | CH | $C_2H_5$ | CH($C_2H_5$)($C_4H_9$) | $C_4H_9$ | $CO_2C_4H_9$ | H | H | — | 638 |
| 146 | IIk | CH | $C_2H_5$ | CH($C_2H_5$)($C_4H_9$) | $C_2H_5$ | CN | — | — | $C_6H_5$ | 636 |
| 147 | IIk | CH | $C_2H_5$ | CH($C_2H_5$)($C_4H_9$) | $C_2H_5$ | CN | — | — | CH($CH_3$)₂ | 620 |

We claim:

1. A triazolopyridine dye of the formula I

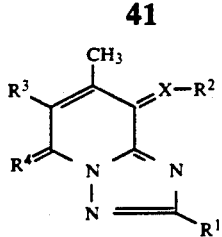 (I)

where

R[1] is $C_1$–$C_{20}$-alkyl, which may be substituted and interrupted by one or more oxygen atoms, or is substituted or unsubstituted phenyl or hydroxyl, R[2] is a 5- or 6-membered carbocyclic or heterocyclic ring which may be substituted and benzo fused, R[3] is cyano, carbamoyl, carboxyl or $C_1$–$C_4$-alkoxycarbonyl, R[4] is oxygen or a radical of the formula

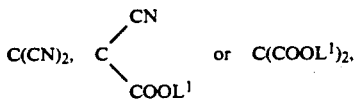

where L[1] is in each case $C_1$–$C_8$-alkyl which may be interrupted by 1 or 2 oxygen atoms, and X is CH or nitrogen.

2. A triazolopyridine data as claimed in claim 1, wherein R[3] is cyano.

3. A triazolopyridine dye as claimed in claim 1, wherein R[2] is selected from the group consisting of benzene, indole, quinoline, aminonaphthalene, pyrrole, aminothiazole, benzimidazole, benzthiazole, aminothiophene or diaminopyridine series.

4. A triazolopyridine dye as claimed in claim 1, wherein R[1] is $C_1$–$C_{12}$-alkyl, which may be substituted by $C_1$–$C_6$-alkanoyloxy, $C_1$–$C_8$-alkoxycarbonyl (whose alkyl chains may each be interrupted by 1 or 2 oxygen atoms), phenyl or $C_1$–$C_4$-alkylphenyl and interrupted by 1 or 2 oxygen atoms.

* * * * *